(12) United States Patent
Rouille et al.

(10) Patent No.: US 7,770,790 B2
(45) Date of Patent: *Aug. 10, 2010

(54) SECURITY SYSTEM

(76) Inventors: David W. Rouille, 1 Sarah La., Maynard, MA (US) 01754; Catherine J. Rouille, 1 Sarah La., Maynard, MA (US) 01754

(*) Notice: Subject to any disclaimer, the term of this patent is extended or adjusted under 35 U.S.C. 154(b) by 311 days.

This patent is subject to a terminal disclaimer.

(21) Appl. No.: 11/888,578

(22) Filed: Aug. 1, 2007

(65) Prior Publication Data

US 2007/0268109 A1 Nov. 22, 2007

Related U.S. Application Data

(63) Continuation of application No. 10/888,405, filed on Jul. 10, 2004, now Pat. No. 7,267,266.

(60) Provisional application No. 60/486,012, filed on Jul. 10, 2003, provisional application No. 60/486,043, filed on Jul. 10, 2003, provisional application No. 60/486,042, filed on Jul. 10, 2003.

(51) Int. Cl.
*G06K 5/00* (2006.01)
*G06K 19/06* (2006.01)
*G08B 13/14* (2006.01)
*G08B 23/00* (2006.01)
*H04B 1/38* (2006.01)

(52) U.S. Cl. .............. 235/380; 235/492; 235/382; 235/493; 340/573.1; 340/5.61; 340/572.1

(58) Field of Classification Search .......... 235/380, 235/492, 441; 340/825.54, 825.5, 572.1, 340/573.1
See application file for complete search history.

(56) References Cited

U.S. PATENT DOCUMENTS

| 4,691,202 | A | * | 9/1987 | Denne et al. ............... 235/382 |
| 5,120,939 | A | | 6/1992 | Claus et al. |
| 5,412,192 | A | | 5/1995 | Hoss |
| 5,539,394 | A | | 7/1996 | Cato et al. |
| 5,613,159 | A | | 3/1997 | Colnot |
| 5,812,065 | A | | 9/1998 | Schrott et al. |
| 5,828,044 | A | | 10/1998 | Jun et al. |
| 5,896,325 | A | | 4/1999 | Fujioka |
| 5,914,657 | A | | 6/1999 | Chen |
| 5,926,110 | A | | 7/1999 | Downs et al. |
| 6,047,888 | A | | 4/2000 | Dethloff |
| 6,070,795 | A | | 6/2000 | Feiken |
| 6,098,879 | A | | 8/2000 | Terranova |

(Continued)

OTHER PUBLICATIONS

"Non-Final Office Action", U.S. Appl. No. 11/982,499, filed Sep. 17, 2009, 10 pages.

(Continued)

*Primary Examiner*—Thien Minh Le
*Assistant Examiner*—Thien T Mai

(57) ABSTRACT

In accordance with the present invention, a method and an apparatus are provided wherein a device is disabled if the device is located more then a predetermined distance away from the owner. Accordingly, a lost or stolen device is rendered unusable. The device has coupled thereto a receiver or transceiver. A transmitter or transceiver is located separately from the device. When the receiver and transmitter can communicate, the device is usable, when the receiver and transmitter cannot communicate, the receiver disables the device, rendering the device unusable.

20 Claims, 2 Drawing Sheets

U.S. PATENT DOCUMENTS

| | | |
|---|---|---|
| 6,111,506 A | 8/2000 | Yap et al. |
| 6,257,486 B1 | 7/2001 | Teicher et al. |
| 6,273,335 B1 | 8/2001 | Sloan |
| 6,398,115 B2 | 6/2002 | Krause |
| 6,726,099 B2 | 4/2004 | Becker et al. |
| 6,778,066 B2 | 8/2004 | Smith |
| 6,955,299 B1 | 10/2005 | Pathmasuntharan et al. |
| 6,967,575 B1 | 11/2005 | Dohrmann et al. |
| 7,061,383 B2 * | 6/2006 | Davis et al. ............ 340/573.1 |
| 2001/0040627 A1 | 11/2001 | Obradovich |
| 2003/0030542 A1 | 2/2003 | von Hoffmann |
| 2003/0034891 A1 | 2/2003 | Pedersen |
| 2003/0106935 A1 | 6/2003 | Burchette, Jr. |
| 2003/0200008 A1 | 10/2003 | Wilson |
| 2003/0210128 A1 | 11/2003 | Dix |
| 2004/0099746 A1 | 5/2004 | Norton |
| 2004/0128508 A1 | 7/2004 | Wheeler et al. |
| 2004/0199474 A1 | 10/2004 | Ritter |
| 2005/0006466 A1 | 1/2005 | Overhultz et al. |
| 2005/0029345 A1 | 2/2005 | Waterhouse et al. |
| 2005/0162269 A1 | 7/2005 | Lambright et al. |

OTHER PUBLICATIONS

"Non-Final Office Action", U.S. Appl. No. 11/982,499, filed Sep. 23, 2009, 13 pages.

"Final Office Action", U.S. Appl. No. 11/982,499, filed Mar. 1, 2010, 12 pages.

* cited by examiner

SECURITY SYSTEM

CROSS REFERENCE TO RELATED APPLICATIONS

This application is a continuation of patent application Ser. No. 10/888,405 filed Jul. 10, 2004, now U.S. Pat. No. 7,267,266 which claims the benefit of provisional patent application Ser. No. 60/486,012 filed Jul. 10, 2003, provisional patent application Ser. No. 60/486,043 filed Jul. 10, 2003 and provisional patent application Ser. No. 60/486,042 filed Jul. 10, 2003, the disclosures of which are incorporated herein by reference.

STATEMENT REGARDING FEDERALLY SPONSORED RESEARCH

Not Applicable

BACKGROUND OF THE INVENTION

Credit cards are well known and are commonly used for purchasing items. A problem associated with credit cards is that they may be easily lost or stolen. A lost or stolen credit card may then be used to purchase items that the rightful owner of the credit card does not intend. This leads to millions of dollars of unauthorized purchases being transacted every year, with the cost being paid by the credit card company and/or the credit card owner.

Electronic devices such as cellular telephones, Personal Digital Assistants (PDAs) and laptop computers are well known and are commonly used for all sorts of activities by a large number of people. A problem associated with these electronic devices is that they may be easily lost or stolen. A lost or stolen cell phone can be used to make calls and accumulate large phone bills. A lost PDA can result in the loss of private or crucial personal and business information. The loss of a laptop computer can result in confidential data being disclosed.

SUMMARY OF THE INVENTION

In accordance with one embodiment of the present invention, an apparatus is provided wherein a credit card is disabled if the card is located more then a predetermined distance away from the owner. Accordingly, a lost or stolen credit card is rendered unusable. The card has coupled thereto a receiver or transceiver. A transmitter or transceiver is located separately from the card. When the receiver and transmitter can communicate, the card is usable, when the receiver and transmitter cannot communicate; the receiver disables the card, rendering the card unusable.

In accordance with another embodiment of the present invention, an apparatus is provided wherein an electronic device is disabled if the device is located more then a predetermined distance away from the owner. Accordingly, a lost or stolen device is rendered unusable. The device card has integrated therein a receiver or transceiver. A transmitter or transceiver is located separately from the device. When the receiver and transmitter can communicate, the device card is usable, when the receiver and transmitter cannot communicate; the receiver disables the device, rendering the device unusable.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
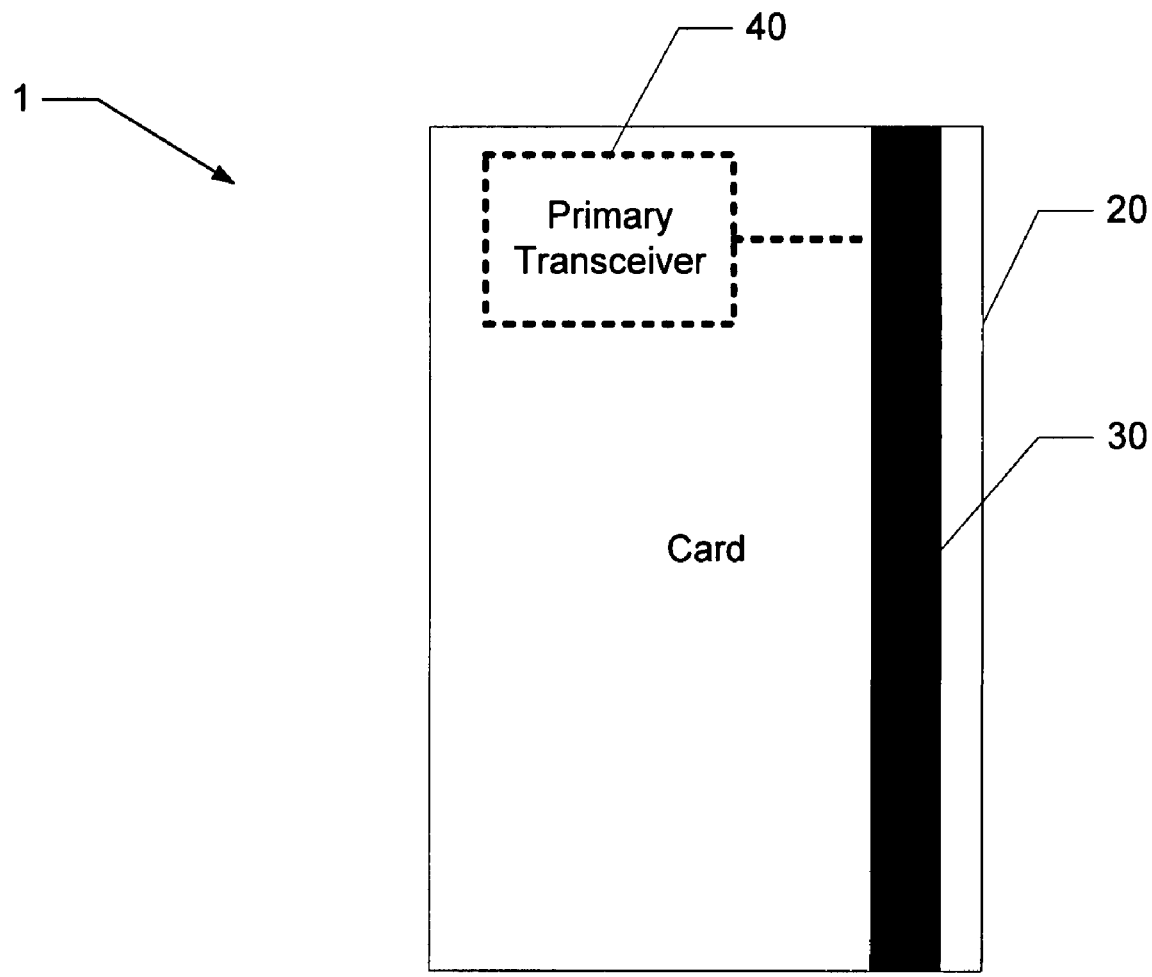
FIG. 1 comprises a block diagram showing the apparatus of the present invention coupled to a card.
Figure 1:
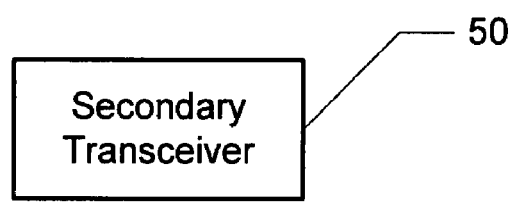

A Radio Frequency Communications System (RFCS) comprises two major components: a Radio Frequency (RF) primary transceiver and a corresponding RF secondary transceiver. The primary and secondary transceivers communicate via radio frequencies (RF). The primary transceiver and secondary transceiver can communicate without line-of-sight, through non-conducting material, at a high rate, and over a distance of several feet. Additionally, the size of a transceiver is very small (smaller than a postage stamp) and the cost very low (less than 10 cents for a passive transceiver).

The secondary transceiver comprises a small microchip attached to an antenna. The secondary transceiver may be active or passive. An active transceiver has its own power source, such as a battery. A passive transceiver receives power from the primary transceiver signal. A passive transceiver may have a range of about 30 feet, while an active transceiver can have a range of up to 3000 feet. The transceiver can be tuned to provide the desired range for the application.

The primary transceiver interrogates one or more secondary transceivers to determine if the secondary transceiver is within range of the primary transceiver, referred to as "pinging" the secondary transceiver(s). If a secondary transceiver responds to the ping, then the secondary transceiver is within the range of the primary transceiver. On the other hand, if the secondary transceiver does not respond to the ping, then the secondary receiver is out of range of the primary transceiver. Optionally, a single primary transceiver may be used with multiple secondary transceivers, which each secondary transceiver having an individual identification number (IN), such that a response to a ping includes the ID number of the secondary transceiver and the primary transceiver can detect which of the secondary transceivers responded to the ping. Further, the primary transceiver may send pings that include an ID number of a transceiver and the transceiver will only respond to a ping that includes the transceivers ID number.

Secondary transceivers receive power by harvesting energy from the electromagnetic field of the primary transceiver's communication signal. Passive transceivers both receive power and communicate within a narrow band of radio frequencies specified by regulation agencies such as the Federal Communications Commission (FCC). The center of this band of frequencies is denoted as f When referring to RFCS operating at frequency f it is implied that this is the center of an operating band of frequencies.

Passive transceivers typically receive power through inductive coupling or through far-field energy harvesting. Inductive coupling uses the magnet field generated by the primary transceiver to induce an electric current through a coupling element, usually an antenna and a capacitor. The current from coupling charges a capacitor that provides voltage and power to the secondary transceiver. Inductive coupling works in the near-field of the communication signal, which extends a $1/2\pi$ times a signal's wavelength from the source.

The operating voltage of an inductively coupled secondary transceiver depends on the flux density at that range from the primary transceiver. At a distance d, the magnetic field emitted by a primary transceiver has decreased to $1/d^3$ its original strength. For a circularly coiled reader antenna with radius R, the flux is maximized at distance d when R approximately equals the square root of 2d. Thus, increasing R increases the range of optimal communication.

Besides inductive coupling, passive transceivers may be powered by collecting energy from the far field which is the range outside ½π the wavelength of a signal. As with inductive coupling, the power available to a transceiver decreases proportional to the distance from the reader, in this case, at a rate of $1/d^2$.

Most RFCS operate in the Industrial-Scientific-Medical (ISM) bands which are available for low power short range RFCS. In the United States, the most common ISM bands used by RFCS are 13.56 MHz and 902-928 MHz. Low frequency licenses are also available in the 9 kHz -135 kHz bands. Devices operating in each band are subject to different power and bandwidth regulations. For example RFCS operating in the 13.56 MHz band are limited to a bandwidth of 14 kHz in the forward channel.

Referring to FIG. 1 a block diagram of a particular embodiment of the apparatus of the present invention is shown. An RFCS 1 is comprised of receiver or primary transceiver 40 and a transmitter or secondary transceiver 50. In order to provide security for a credit card 20, the primary transceiver is either coupled to or integrated with a credit card 20. While the description uses a credit card, it should be understood that similar types of financial transaction cards such as ATM cards, debit cards, gift cards and the like are also within the scope of the present invention, therefore the term credit card as used herein is understood to also include these other types of financial transaction cards.

The credit card 20 includes a magnetic strip 30 that contains coded information. The primary transceiver 40 is coupled to the magnetic strip of credit card 20. In operation the primary transceiver pings the secondary transceiver. If the secondary transceiver is with in the range of the primary transceiver 40, the secondary transceiver responds to the ping with an answer. The answer is received by the primary transceiver and the credit card is usable.

When the primary transceiver pings the secondary transceiver and the secondary transceiver is out of range then the primary transceiver does not receive a response and the primary transceiver disables the magnetic strip, thus rendering the card 20 unusable.

The secondary transceiver is located separately from the primary transceiver such as being installed on a key ring or in a wallet, purse, or other article that a person would normally have with them when using their credit card. Thus, under normal circumstances, the primary transceiver (disposed on the card or integrated with the card) is located within the range of the secondary transceiver and the card functions normally. However, of the card is lost or stolen, chances are that the card will be located a distance away from the secondary transceiver which is located on the owners key ring or wallet or purse and as such, the primary receiver would not receive an answer to a ping, and the primary transceiver disables the magnetic strip, rendering the card unusable.

The primary transceiver may include a timing circuit such that the pings are made at regular intervals, such as once an hour, once every four hours, once a day or any desired time interval. This helps save battery life of the primary transceiver.

In an alternate embodiment the secondary transceiver is located on or integrated with the card and is coupled to the magnetic strip of credit card, while the primary transceiver is located remotely from the card. In operation the primary transceiver pings the secondary transceiver. If the secondary transceiver is with in the range of the primary transceiver 40, the secondary transceiver detects the ping and the credit card is usable.

When the primary transceiver pings the secondary transceiver and the secondary transceiver is out of range then the secondary transceiver (not having received a ping for a predetermined amount of time) disables the magnetic strip, thus rendering the card 20 unusable.

When the card is rendered unusable, preferably the card is not permanently unusable, but can be made usable again once the secondary transceiver is within range of the primary transceiver. Optionally, the card can be made permanently unusable once the secondary transceiver is out of range of the primary transceiver (e.g. by magnetically altering the information on the magnetic strip).

Figure 2:
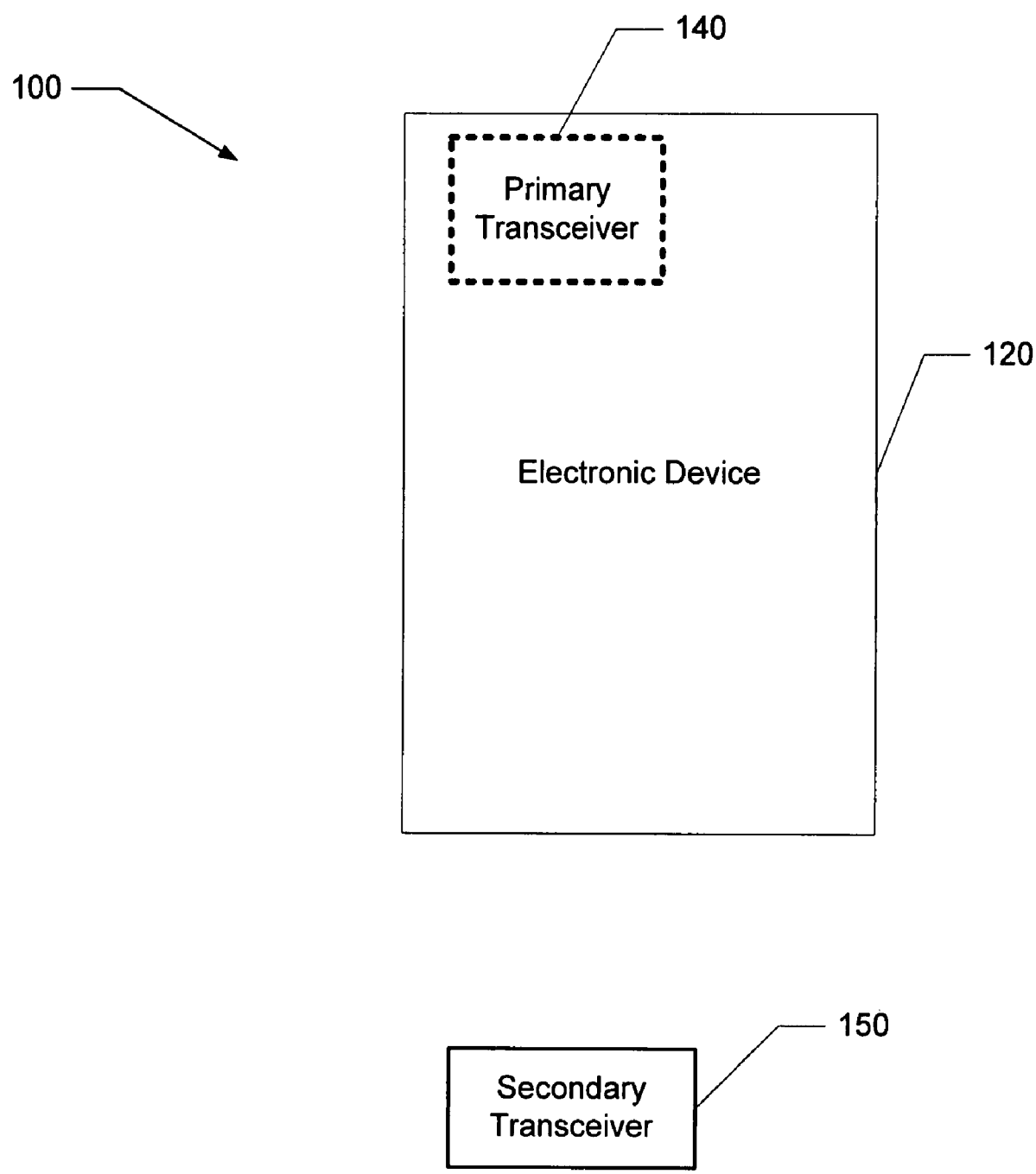
FIG. 2 comprises a block diagram showing the apparatus of the present invention coupled to a device.

Referring now to FIG. 2, a block diagram of another embodiment of the apparatus of the present invention is shown. An RFCS 100 is comprised of receiver or primary transceiver 140 and a transmitter or secondary transceiver 150. In order to provide security for a device 120, the primary transceiver is either coupled to or integrated with the device 120.

The primary transceiver 140 is coupled to the device such that the transceiver is utilized as part of a power-up sequence or an activity sequence. In operation, during power-up or an activity the primary transceiver pings the secondary transceiver. If the secondary transceiver is with in the range of the primary transceiver 140, the secondary transceiver responds to the ping with an answer. The answer is received by the primary transceiver and the activity or power-up sequence continues.

When the primary transceiver pings the secondary transceiver and the secondary transceiver is out of range then the primary transceiver does not receive a response and the primary transceiver prevents execution of the power-up sequence or activity, thus rendering the device 120 unusable. In the case where the device is a cellular telephone, the activity may be sending a call, typically performed by entering a telephone number and pushing a "SEND" button on the phone. The pushing of the "SEND" button in this instance results in the primary transceiver sending a ping to the secondary transceiver and if a response is received, the "SEND" operation is allowed to complete and the call is initiated. However, if there is no response received by the primary transceiver, then the "SEND" operation terminates without the call being dialed, rendering the phone unusable for outgoing calls. A similar situation occurs when the "SEND" button is used to answer a ringing phone. Before the call is answered, the primary transceiver sends a ping to the secondary transceiver and if a response is received, the "SEND" operation is allowed to complete and the call is answered. However if there is no response received by the primary transceiver, then the "SEND" operation terminates without the call being answered, rendering the phone unusable to receive incoming calls.

The secondary transceiver is located separately from the primary transceiver such as being installed on a key ring or in a wallet, purse, or other article that a person would normally have with them when using their credit card. Thus, under normal circumstances, the primary transceiver (disposed within the device) is located within the range of the secondary transceiver and the device functions normally. However, of the device is lost or stolen, chances are that the device will be located a distance away from the secondary transceiver which is located on the owners key ring or wallet or purse and as such, the primary receiver would not receive an answer to a ping, and the primary transceiver disables the execution of a power-up sequence or activity, rendering the device unusable.

When the device is rendered unusable, preferably the device is not permanently unusable, but can be made usable again once the secondary transceiver is within range of the primary transceiver. Optionally, the device can be made permanently unusable once the secondary transceiver is out of range of the primary transceiver.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
    initiating, by a financial transaction card, a financial transaction by transmitting at least one signal to an authorized holder transceiver;
    allowing, by the financial transaction card, the financial transaction responsive to receiving a reply from the authorized holder transceiver; and
    disallowing, by the financial transaction card, the financial transaction by disabling a magnetic strip on the financial transaction card responsive to not receiving a reply from the authorized holder transceiver.

2. The computer-implemented method as recited by claim 1, wherein the financial transaction card comprises a credit card, a debit card, or a gift card.

3. The computer-implemented method as recited by claim 1, wherein the at least one signal is transmitted at a periodic time interval.

4. The computer-implemented method as recited by claim 1, wherein the at least one signal is transmitted using an Industrial-Scientific-Medical (ISM) frequency.

5. The computer-implemented method as recited by claim 1, wherein the authorized holder transceiver is configured to be carried by an authorized card holder.

6. The computer-implemented method as recited by claim 1, wherein the disallowing the financial transaction comprises disabling the financial transaction card.

7. The computer-implemented method as recited by claim 1, wherein the authorized holder transceiver is configured to be powered passively.

8. The computer-implemented method as recited by claim 1, wherein the at least one signal contains an identifier configured to identify the authorized holder transceiver.

9. The computer-implemented method as recited by claim 8, further comprising receiving, by the financial transaction card, a reply from the authorized holder transceiver, wherein the authorized holder transceiver is configured to transmit a reply responsive to receiving a signal containing the identifier.

10. A tangible computer-readable medium having instructions stored thereon, the instructions comprising:
    instructions for initiating, with a financial transaction card, a financial transaction by transmitting a signal from the financial transaction card to one or more transceivers, wherein at least one of the one or more transceivers comprises an authorized holder transceiver;
    instructions for allowing the financial transaction to be performed with the financial transaction card responsive to receiving a reply to the signal, wherein the reply comprises at least one identifier configured to identify at least one authorized holder transceiver; and
    instructions for disallowing the financial transaction from being performed with the financial transaction card by disabling a magnetic strip on the financial transaction card responsive to not receiving a reply to the signal.

11. The tangible computer-readable medium as recited by claim 10, wherein the financial transaction card comprises a credit card, a debit card, or a gift card.

12. The tangible computer-readable medium as recited by claim 10, wherein the signal is transmitted at a periodic time interval.

13. The tangible computer-readable medium as recited by claim 10, wherein the at least one authorized holder transceiver is configured to be carried by an authorized card user.

14. The tangible computer-readable medium as recited by claim 10, wherein the not receiving a reply to the signal comprises not receiving a reply from at least one identified authorized holder transceiver.

15. A financial transaction card comprising:
    a memory device embodying one or more instructions for allowing or disallowing a financial transaction to be performed with the financial transaction card; and
    a transceiver coupled to the memory device, wherein the transceiver is configured to initiate a financial transaction by transmitting a signal to an authorized holder transceiver;
    wherein the one or more instructions allow or disallow a financial transaction to be performed with the financial transaction card based on whether a reply is or is not received, respectively, to the signal, and wherein the one or more instructions disallow a financial transaction by disabling a magnetic strip on the financial transaction card.

16. The financial transaction card as recited in claim 15, wherein the transceiver is further configured to transmit the signal at a recurring time interval.

17. The financial transaction card as recited in claim 15, wherein the transceiver is powered passively.

18. The financial transaction card as recited in claim 15, wherein the transceiver is a radio frequency transceiver configured to transmit the signal using an Industrial-Scientific-Medical (ISM) frequency.

19. The financial transaction card as recited in claim 15, wherein the one or more instructions disallow a financial transaction by disabling the memory device.

20. The financial transaction card as recited in claim 19, further comprising one or more instructions for enabling the memory device responsive to receiving a signal from an authorized holder transceiver.

* * * * *